(12) United States Patent
Takagi

(10) Patent No.: US 9,313,731 B2
(45) Date of Patent: Apr. 12, 2016

(54) CONNECTION REQUEST FOR BASE STATIONS THAT USE THE SAME FREQUENCY IN THE SAME COVERAGE AREA

(75) Inventor: Kenki Takagi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 640 days.

(21) Appl. No.: 13/583,162

(22) PCT Filed: Mar. 11, 2011

(86) PCT No.: PCT/JP2011/001432
§ 371 (c)(1),
(2), (4) Date: Sep. 6, 2012

(87) PCT Pub. No.: WO2011/135773
PCT Pub. Date: Nov. 3, 2011

(65) Prior Publication Data
US 2012/0329505 A1    Dec. 27, 2012

(30) Foreign Application Priority Data
Apr. 27, 2010    (JP) .................................. 2010-102342

(51) Int. Cl.
*H04W 72/04* (2009.01)
*H04W 76/02* (2009.01)
*H04W 48/20* (2009.01)

(52) U.S. Cl.
CPC .............. *H04W 48/20* (2013.01); *H04W 76/02* (2013.01)

(58) Field of Classification Search
None
See application file for complete search history.

(56) References Cited

U.S. PATENT DOCUMENTS

| 2008/0153521 A1 | 6/2008 | Benaouda et al. |
| 2010/0202402 A1* | 8/2010 | Dalsgaard et al. ............ 370/331 |
| 2010/0267385 A1 | 10/2010 | Iwamura et al. |

FOREIGN PATENT DOCUMENTS

| CN | 101180790 A | 5/2008 |
| JP | 8-198415 A | 8/1996 |
| JP | 2007-318289 A | 12/2007 |
| WO | 2009/063994 A1 | 5/2009 |
| WO | 2009081772 A1 | 7/2009 |

OTHER PUBLICATIONS

Communication dated Nov. 15, 2014 from the State Intellectual Property Office of the People's Republic of China in counterpart Chinese Patent Application No. 201180020702.0.
Communication dated Jul. 6, 2015 from the State Intellectual Property Office of the People's Republic of China in counterpart application No. 201180020702.0.

* cited by examiner

*Primary Examiner* — Philip Sobutka
(74) *Attorney, Agent, or Firm* — Sughrue Mion, PLLC

(57) ABSTRACT

A radio communication system according to the present invention includes a base station apparatus 10 that performs data communication with a communication apparatus 100 by using a predetermined frequency band; a base station apparatus 20 that performs data communication with a communication apparatus 200 by using the same frequency band as the frequency band in the same coverage area as that of the base station apparatus 10; determination means 30 for acquiring identification information included in a connection request transmitted from the communication apparatus 100 or 200 by using the frequency band, and for determining to connect to the base station apparatus 10 when the identification information indicates the communication apparatus 100, and to connect to the base station apparatus 20 when the identification information indicates the communication apparatus 200.

8 Claims, 9 Drawing Sheets

| PRACH Configuration Index | Preamble Format | System frame number | Subframe number |
|---|---|---|---|
| 6 | 0 | ANY | 1, 6 |
| 22 | 1 | ANY | 1, 6 |
| 65 | 0 | ANY | 9 |
| 66 | 1 | ANY | 9 |

Fig. 5

CONNECTION REQUEST FOR BASE STATIONS THAT USE THE SAME FREQUENCY IN THE SAME COVERAGE AREA

CROSS REFERENCE TO RELATED APPLICATIONS

This application is a National Stage of International Application No. PCT/JP2011/001432 filed Mar. 11, 2011, claiming priority based on Japanese Patent Application No. 2010-102342, filed Apr. 27, 2010, the contents of all of which are incorporated herein by reference in their entirety.

TECHNICAL FIELD

The present invention relates to a radio communication system, a radio base station apparatus, a core network apparatus, and a data communication method. In particular, the present invention relates to a radio communication system in which different radio base station apparatuses perform communication using the same frequency band in a coverage area, a radio base station apparatus constituting the radio communication system, a core network apparatus connected to the radio base station apparatus, and a data communication method used in the radio communication system.

BACKGROUND ART

The prevalence of subscribers to cellular phone networks has reached 90% or more of the entire population in developed countries. In some of the developed countries, the prevalence of the subscribers has reached nearly 120%. Thus, the spread of cellular phones to general users has already reached saturation. Meanwhile, in order for a cellular phone operator to further improve sales, it is necessary to increase the number of subscribers to cellular phones. Therefore, the Machine-to-Machine (M2M) market in which communication is performed not between persons but between machines has been attracting attention as a new target for subscribers to cellular phones. Possible examples of a machine terminal include a vending machine, an automobile (car navigation), and a traffic light.

Patent Literature 1 discloses the following configuration as an example using the machine terminal. A computer located in an office or the like acquires inventory data on warehouses, vending machines, and the like located at remote locations, via a network using a cellular phone. Thus, the acquisition of the inventory data via the network using the cellular phone eliminates the need for a dedicated line between each vending machine or the like and the office, and reduces a construction cost for laying the dedicated line, for example.

When the communication between machine terminals is compared with the communication between user terminals such as cellular phones, there is the following difference. That is, there is a large difference between "quality level required for communication service" which is required for the network in the communication between machine terminals and "quality level required for communication service" which is required for the network in the communication between user terminals. Specifically, in voice call, web browsing, and the like performed by a general user, the general user can notice a disconnection of the communication or a delay in the communication. Thus, the disconnection of the communication or the delay in the communication makes the user notice uncomfortable. Therefore, there is a demand for an extremely high quality level of communication service.

On the other hand, the main operation in the communication performed by machine terminals is uploading or downloading of data on a regular basis (once a day, one every several hours, etc.). Accordingly, communication service provided using machine terminals is less affected by a disconnection of the communication, a delay in the communication, or the like. As a result, when the communication between user terminals is compared with the communication between machine terminals, the "quality level required for communication service" which is required for the communication between machine terminals is relatively low.

Therefore, if the number of subscribers to machine terminals is increased to the same level as the number of subscribers of general users in the future, an expansion of networks for general users as networks for processing traffic of machine terminals may result in excessive capital investment.

CITATION LIST

Patent Literature

[Patent Literature 1] Japanese Unexamined Patent Application Publication No. 08-198415

SUMMARY OF INVENTION

Technical Problem

As a new network configuration for dealing with an increase in the number of machine terminals, it is possible to adopt an apparatus form of a radio base station that covers the areas that are covered by a plurality of radio base station apparatuses used for communication with a user terminal such as a cellular phone. The radio base station that covers the areas covered by a plurality of radio base station apparatuses as described above is called a centralized radio base station. The centralized radio base station has the following features.

A first feature is that the centralized radio base station transmits/receives data using the same frequency band as the frequency band in which a typical radio base station transmits/receives data.

A second feature is that in a coverage area common to the typical radio base station and the centralized radio base station, a user terminal performs communication via the typical radio base station and a machine terminal performs communication via the centralized radio base station.

When a network using the centralized radio base station is configured, the following problem may occur. The typical radio base station and the centralized radio base station use the same frequency band. Accordingly, data transmitted from the user terminal or the machine terminal is transmitted to the typical radio base station and the centralized radio base station. This leads to a problem that the data transmitted from the machine terminal affects the quality of the user terminal which performs communication via the typical radio base station.

The present invention has been made to solve such a problem, and an object of the present invention is to provide a radio communication system, a radio base station apparatus, a core network apparatus, and a data communication method which determine a base station apparatus to which data is to be transmitted for each terminal and connect a terminal with a base station apparatus to which data is to be transmitted.

Solution to Problem

A radio communication system according to a first aspect of the present invention includes: a first base station apparatus that performs data communication with a first communication apparatus by using a predetermined frequency band; a second base station apparatus that performs data communication with a second communication apparatus by using the same frequency band as the frequency band of the first base station apparatus in a coverage area identical with the coverage area of the first base station apparatus; and a determination unit that acquires identification information included in a connection request transmitted from the first or second communication apparatus by using the frequency band, and determines to connect to the first base station apparatus when the identification information indicates the first communication apparatus, and to connect to the second base station apparatus when the identification information indicates the second communication apparatus.

A base station apparatus according to a second aspect of the present invention performs data communication with a second communication apparatus by using a frequency band identical with a frequency band used in a first base station apparatus that performs data communication with a first communication apparatus, in a coverage area identical with the coverage area of the first base station apparatus, the base station apparatus including: a determination unit that acquires identification information included in a connection request transmitted from the first or second communication apparatus by using the frequency band, and determines not to connect to the first base station apparatus when the identification information indicates the first communication apparatus, and to connect to the second base station apparatus when the identification information indicates the second communication apparatus.

A core network apparatus according to a third aspect of the present invention is connected to a first base station apparatus and a second base station apparatus, the first base station apparatus being configured to perform data communication with a first communication apparatus by using a predetermined frequency band, the second base station apparatus being configured to perform data communication with a second communication apparatus by using the same frequency band as the frequency band of the first base station apparatus in a coverage area identical with the coverage area of the first base station apparatus, the core network apparatus including: a determination unit that acquires identification information included in a connection request transmitted from the first or second communication apparatus by using the frequency band, and determines to connect to the first base station apparatus when the identification information indicates the first communication apparatus, and to connect to the second base station apparatus when the identification information indicates the second communication apparatus.

A data communication method according to a fourth aspect of the present invention performs data communication with a second communication apparatus by using a frequency band identical with a frequency band used in a first base station that performs data communication with a first communication apparatus, in a coverage area identical with the coverage area of the first base station, the method including the steps of: acquiring, from the first or second communication apparatus, identification information included in a connection request transmitted using the frequency band; and disconnecting from the first communication apparatus when the identification information indicates the first communication apparatus, and connecting to the second communication apparatus when the identification information indicates the second communication apparatus.

Advantageous Effects of Invention

According to the present invention, it is possible to provide a radio communication system, a radio base station apparatus, a core network apparatus, and a data communication method which determine a base station apparatus to which data is to be transmitted for each terminal and connect a terminal with a base station apparatus to which data is to be transmitted.

BRIEF DESCRIPTION OF DRAWINGS

FIG. 5 is an explanatory diagram of PREACH Configuration according to the first exemplary embodiment;

DESCRIPTION OF EMBODIMENTS

First Exemplary Embodiment

Figure 1:
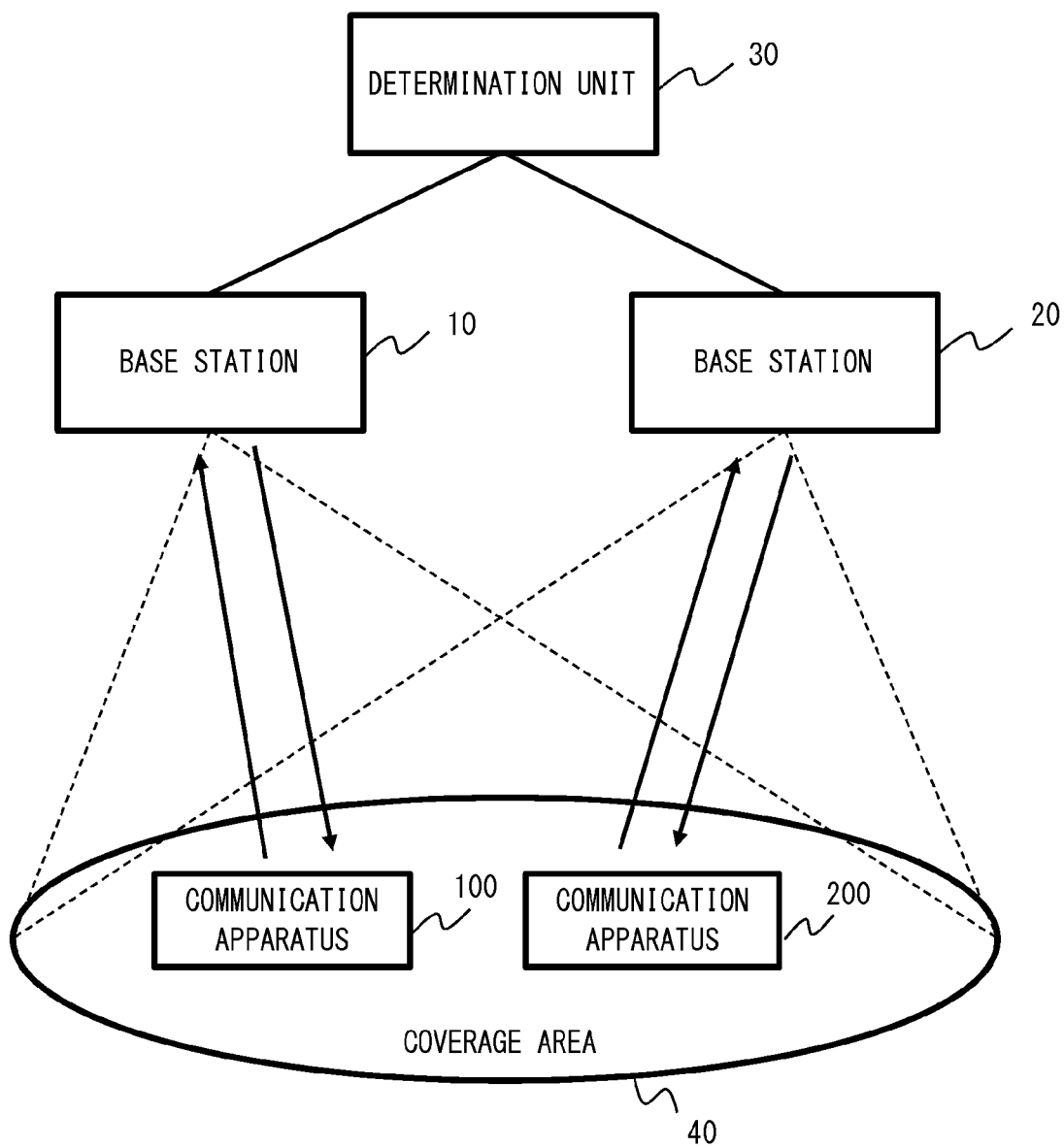
FIG. 1 is a block diagram of a radio system according to a first exemplary embodiment.

Hereinafter, an exemplary embodiment of the present invention will be described with reference to the drawings. Referring to FIG. 1, a configuration example of a radio communication system according to a first exemplary embodiment of the present invention will be described. The radio communication system includes a base station 10, a base station 20, a communication apparatus 100, a communication apparatus 200, and a determination unit 30.

The base station 10 performs data communication with the communication apparatus 100 by using a predetermined frequency band. The predetermined frequency band is a frequency band determined at the network designing stage. The base station 10 includes a coverage area 40. The base station 10 performs communication with the communication apparatus within the coverage area 40 by using the predetermined frequency band.

The base station 20 has the coverage area 40 which is the same coverage area as that of the base station 10. Further, the base station 20 performs communication with the communication apparatus 200 by using the same frequency band as the frequency band used by the base station 10.

The communication apparatus 100 or the communication apparatus 200 transmits a connection request to the base station 10 or the base station 20 by using the predetermined frequency band to perform data communication with the base station 10 or the base station 20. The connection request transmitted from the communication apparatus 100 or the communication apparatus 200 includes identification information indicating the communication apparatus 100 or the communication apparatus 200.

The determination unit 30 acquires the identification information via the base station 10 or the base station 20. When the acquired identification information indicates the communication apparatus 100, the determination unit 30 determines to connect to the base station 10. When the acquired identification information indicates the communication apparatus 200, the determination unit 30 determines to connect to the base station 20.

As described above, the use of the radio communication system shown in FIG. 1 enables the determination unit 30 to determine the base station with which the communication apparatus 100 and the communication apparatus 200 are to communicate, by using the identification information, even when the base station 10 and the base station 20, each of which perform communication using the same frequency band, exist in the same coverage area. Accordingly, it is possible to prevent execution of processing on data transmitted from the communication apparatus to be connected to another base station, in each base station.

Figure 2:
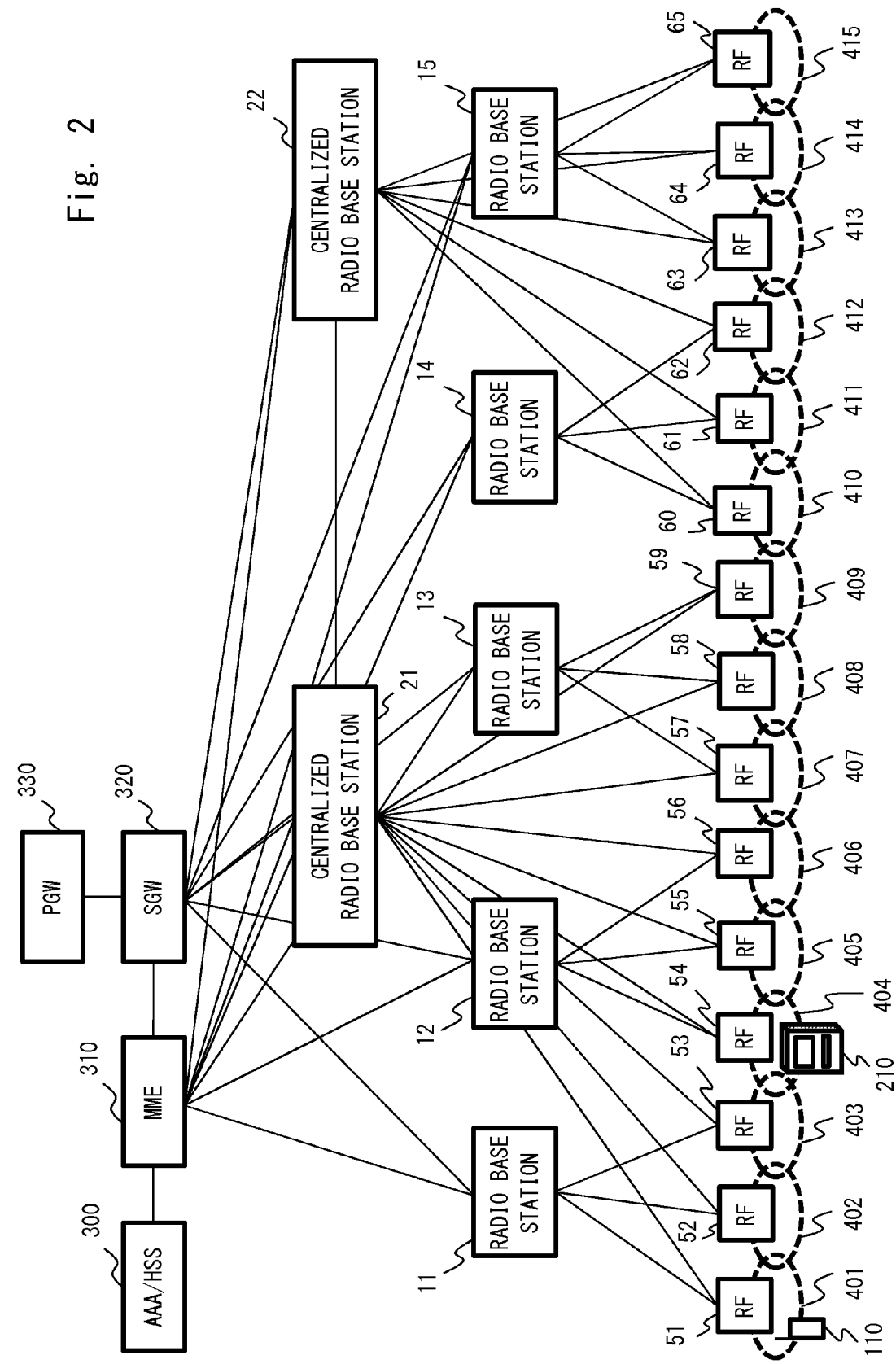
FIG. 2 is a block diagram of the radio system according to the first exemplary embodiment.

Referring next to FIG. 2, a detailed configuration example of the radio communication system according to the first exemplary embodiment of the present invention will be described. The radio communication system includes radio base stations 11 to 15, centralized radio base stations 21 and 22, amplifiers (RF modules) 51 to 65, an AAA (Authentication Authorization Accounting)/HSS (Home Subscriber Server) 300, an MME (Mobility Management Entity) 310, an SGW (Serving Gateway) 320, and a PGW (Packet data network Gateway) 330. The RF modules 51 to 65 include coverage areas 401 to 415, respectively. A user terminal 110 exists in the coverage area 401, and a machine terminal 210 exists in the coverage area 404.

The radio base stations 11 to 15 and the centralized radio base stations 21 and 22 are each connected to the SGW 320 and the MME 310 which are core network apparatuses. The SGW transfers data transmitted from each terminal. The MME manages the movement of each terminal. The MME 310 is connected with the AAA/HS 300. The AAA/HS 300 performs authentication of each terminal and management of service information, for example. The PGW 330 is connected with the SGW 320. The PGW 330 transfers the data transmitted from each terminal to an external network.

Differences between each radio base station and each centralized radio base station will now be described. The radio base station transmits/receives data to/from a user terminal in which data communication is executed by the operation of a user. Examples of the user terminal include a cellular phone and a PDA (Personal Digital Assistant). Examples of the data transmission/reception operation using the user terminal include voice call and web browsing. On the other hand, the centralized radio base station transmits/receives data to/from a machine terminal which requires no user's operation during execution of data communication. Examples of the machine terminal include a vending machine, a car navigation terminal, and a traffic light. Examples of the data transmission/reception operation using the machine terminal include uploading or downloading of data on a regular basis, for example, once a day, or once every several hours or several minutes.

Thus, the radio base station and the centralized radio base station are different in the type of the terminal with which communication is performed. In data communication using the user terminal, a general user can notice the quality of the communication. Accordingly, the communication quality required for the data communication using the user terminal is higher than the communication quality required for the data communication using the machine terminal. Examples of the required communication quality include a data delay, throughput, and the frequency of disconnection of communication.

As described above, the communication quality required for the radio base station is different from that required for the centralized radio base station. Accordingly, for example, the centralized radio base station may increase the number of machine terminals accommodated, by reducing a radio resource to be allocated to the machine terminal as compared with a radio resource to be allocated to the user terminal by the radio base station. Since the radio resource to be allocated to the machine terminal is reduced, the throughput in the communication between the centralized radio base station and the machine terminal becomes lower than the throughput in the communication between the radio base station and the user terminal. However, the number of machine terminals accommodated in the centralized radio base station can be increased as compared with the number of user terminals accommodated in the radio base station.

Further, the increase in the number of machine terminals accommodated in the centralized radio base station may cause an increase in processing load of the centralized radio base station and an increase in delay of the communication with the machine terminal.

As described above, the communication quality required for the radio base station is different from that required for the centralized radio base station. Accordingly, the centralized radio base station can accommodate a larger number of machine terminals by lowering the communication quality such as a data delay and throughput. Thus, as shown in FIG. 2, each centralized radio base station covers the areas that are covered by a plurality of radio base stations, thereby making it possible to deal with the increase in the number of machine terminals. The connection configuration among the radio base stations, the centralized radio base stations, and the RF modules will be described below.

The radio base station 11 is connected to each of the RF modules 51 to 53. The radio base station 12 is connected to each of the RF modules 54 to 56. The radio base station 13 is connected to each of the RF modules 57 to 59. The radio base station 14 is connected each of the RF modules 60 to 62. The radio base station 15 is connected to each of the RF modules 63 to 65.

The centralized radio base station 21 is connected to each of the RF modules 51 to 59. The centralized radio base station 22 is connected to each of the RF modules 60 to 65.

Since the radio base station 11 is connected to each of the RF modules 51 to 53, the radio base station 11 transmits/receives data to/from the user terminals existing in the respective coverage areas 401 to 403. In FIG. 2, the radio base station 11 transmits/receives data to/from the user terminal 110 existing in the coverage area 401. Also the radio base stations 12 to 15 transmit/receive data to/from the user terminals existing in the respective coverage areas included in the connected RF modules.

The data transmitted from the radio base station 11 to the user terminal 110 is output from the radio base station 11 to the RF module 51. The RF module 51 amplifies the output data and transmits the data to the user terminal 110 by radio communication. The data transmitted from the user terminal 110 to the radio base station 11 is transmitted from the user terminal 110 to the RF module 51 by radio communication. The RF module 51 amplifies the transmitted data and outputs the data to the radio base station 11. The radio base stations 12 to 15 have the same configuration as that of the radio base station 11 except that the RF module to be connected is different, so a detailed description thereof is omitted.

Since the centralized radio base station 21 is connected to each of the RF modules 51 to 59, the centralized radio base station 21 transmits/receives data to/from the machine terminals existing in the respective coverage areas 401 to 409. In FIG. 2, the centralized radio base station 21 transmits/receives data to/from the machine terminal 210 existing in the coverage area 404. Also the centralized radio base station 22 transmits/receives data to/from the machine terminals existing in the respective coverage areas included in the connected RF modules.

The data transmitted from the centralized radio base station 21 to the machine terminal 210 is output from the centralized radio base station 21 to the RF module 51. The RF module 51 amplifies the output data and transmits the data to the machine terminal 210 by radio communication. The data transmitted from the machine terminal 210 to the centralized radio base station 21 is transmitted from the machine terminal 210 to the RF module 51. The RF module 51 amplifies the transmitted data and outputs the data to the centralized radio base station 21. The centralized radio base station 22 has the same configuration as that of the centralized radio base station 21 except that the RF module to be connected is different, so a detailed description thereof is omitted.

As described above, the centralized radio base station 21 is connected to each of the RF modules 51 to 59 that are identical with the RF modules to which the radio base stations 11 to 13 are connected. For this reason, the centralized radio base station 21 includes the coverage areas 401 to 409 that are identical with the coverage areas included in the radio base stations 11 to 13, and performs communication using the same frequency as that of the radio base stations 11 to 13.

Figure 3:
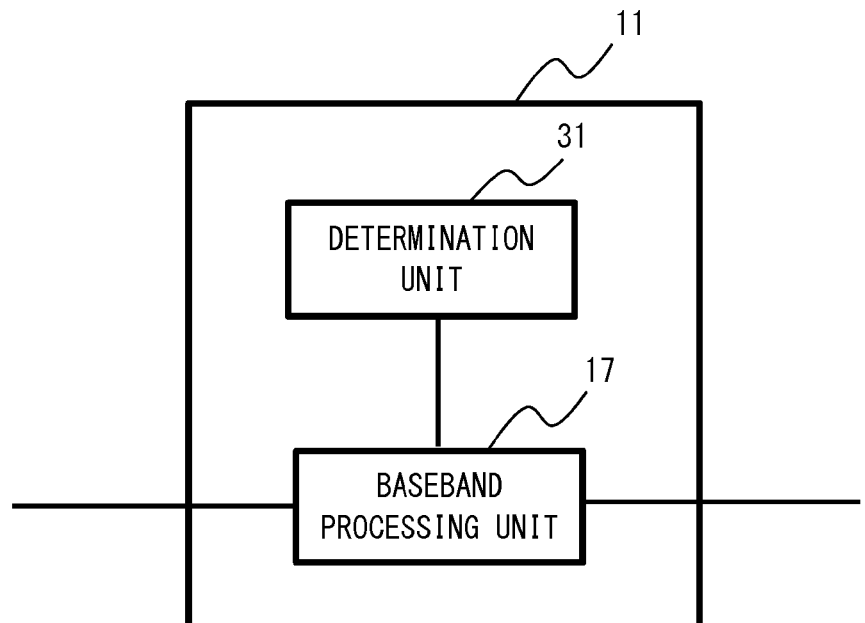
FIG. 3 is a block diagram of a radio base station according to the first exemplary embodiment.
Figure 4:
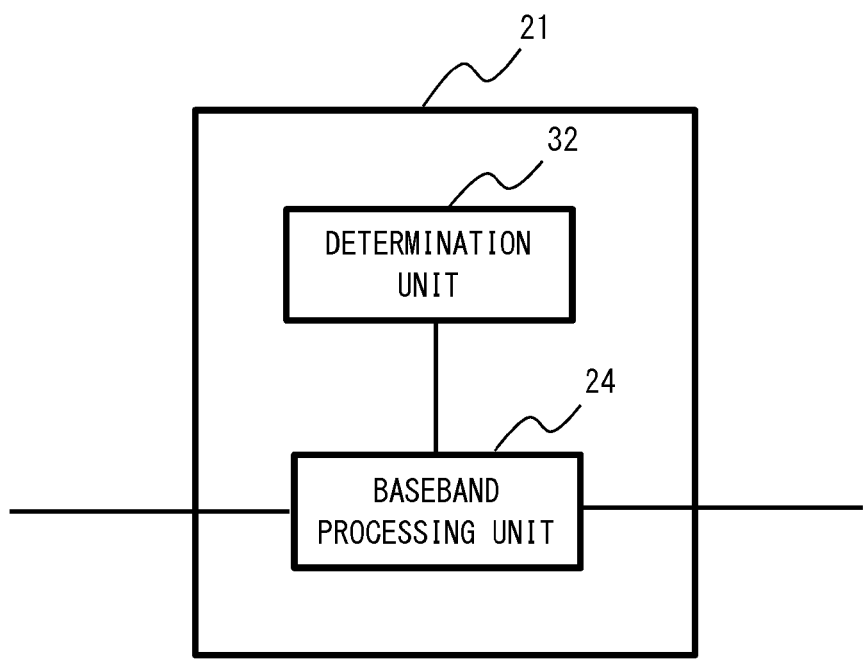
FIG. 4 is a block diagram of a centralized radio base station according to the first exemplary embodiment.

Referring next to FIGS. 3 and 4, configuration examples of the radio base station 11 and the centralized radio base station 21 according to the first exemplary embodiment of the present invention will be described. The radio base stations 12 to 15 have the same configuration as that of the radio base station 11, so a detailed description thereof is omitted. The centralized radio base station 22 has the same configuration as that of the centralized radio base station 21, so a detailed description thereof is omitted.

The radio base station 11 shown in FIG. 3 includes a baseband processing unit 17 and a determination unit 31. The baseband processing unit 17 performs baseband processing such as decoding and encoding of data to be transmitted/received between the radio base station 11 and the RF modules 51 to 53.

The determination unit 31 determines whether the terminal existing in each of the coverage areas 401 to 403 is a user terminal or a machine terminal, and determines whether to connect the terminal to the radio base station 11.

The centralized radio base station 21 shown in FIG. 4 includes a baseband processing unit 24 and a determination unit 32, like the radio base station 11. The baseband processing unit 24 performs baseband processing such as decoding and encoding of data to be transmitted between the centralized radio base station 21 and the RF modules 51 to 59.

The determination unit 32 determines whether the terminal existing in each of the coverage areas 401 to 409 is a user terminal or a machine terminal, and determines whether to connect the terminal to the centralized radio base station 21.

Connection determination processing of the determination units 31 and 32 which are respectively included in the radio base station 11 and the centralized radio base station 21 will now be described. The determination units 31 and 32 perform the connection determination processing by using information defined in PRACH Configuration. Referring to FIG. 5, a configuration example of the PRACH Configuration will now be described. The PRACH Configuration is configured of Index, Preamble Format, System frame number, and Subframe number.

The term "subframe number" refers to the number for identifying a subframe used during transmission/reception of data. FIG. 5 shows an example in which Subframe number 1 or 6 is allocated to the user terminal and Subframe number 9 is allocated to the machine terminal. Accordingly, the user terminal 110 sets data to Subframe number 1 or 6 and transmits the data to the radio base station 11. The machine terminal 210 sets data to Subframe number 9 and transmits the data to the centralized radio base station 21. At this time, the radio base station 11 processes only the data transmitted from the user terminal, so PRACH Configuration Index 6 is set. Further, the centralized radio base station 21 processes only the data transmitted from the machine terminal, so PRACH Configuration Index 65 is set.

When the data transmitted from the terminal is transmitted using Subframe number 1 or 6, the determination unit 31 processes the received data. When the data transmitted from the terminal is transmitted using Subframe number 9, the determination unit 31 discards the received data and does not perform the subsequent data processing. When the data transmitted from the terminal is transmitted using Subframe number 9, the determination unit 32 processes the received data. When the data transmitted from the terminal is transmitted using Subframe number 1 or 6, the determination unit 32 discards the received data and does not perform the subsequent data processing.

Figure 6:
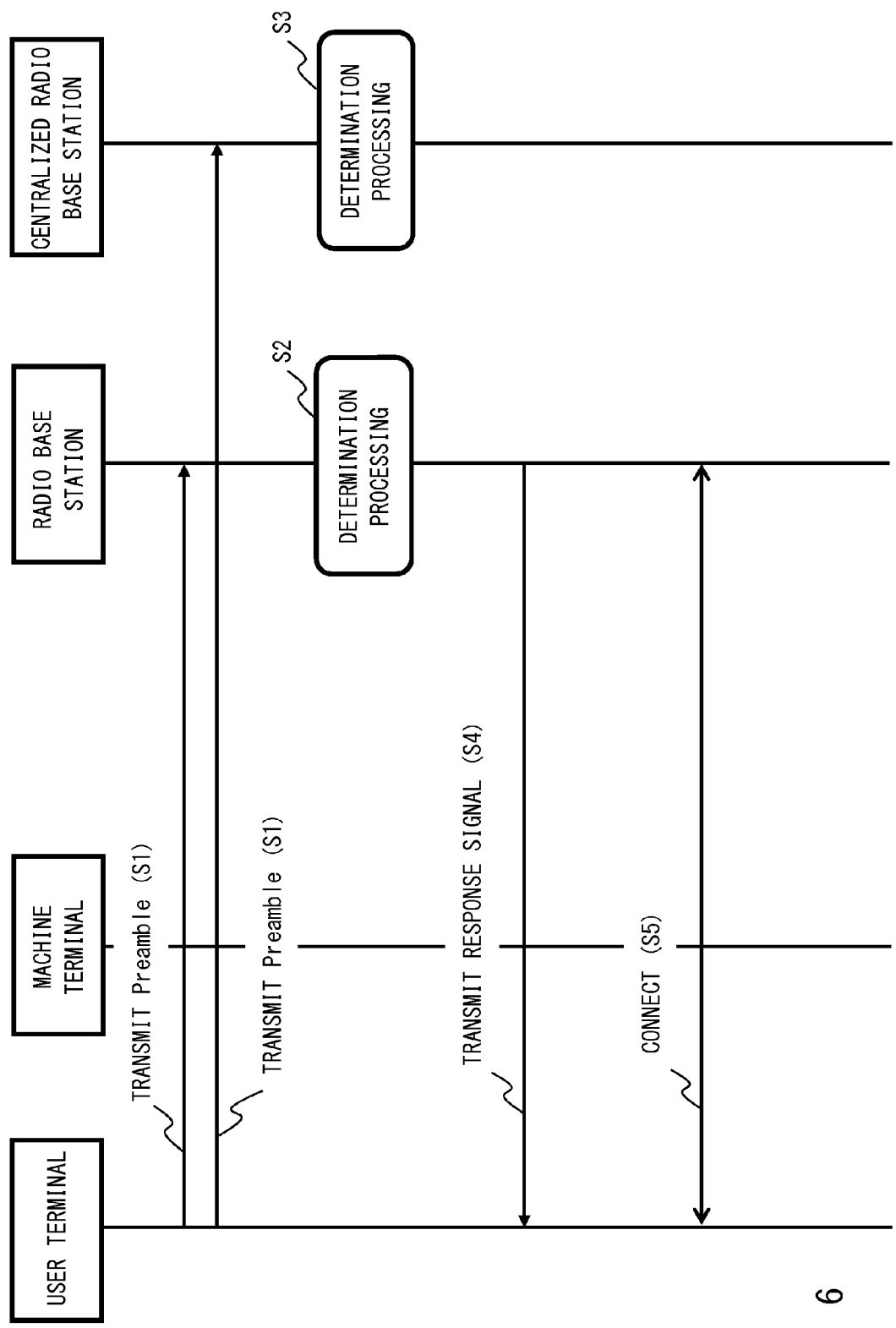
FIG. 6 is a connection sequence of the radio system according to the first exemplary embodiment.
Figure 7:
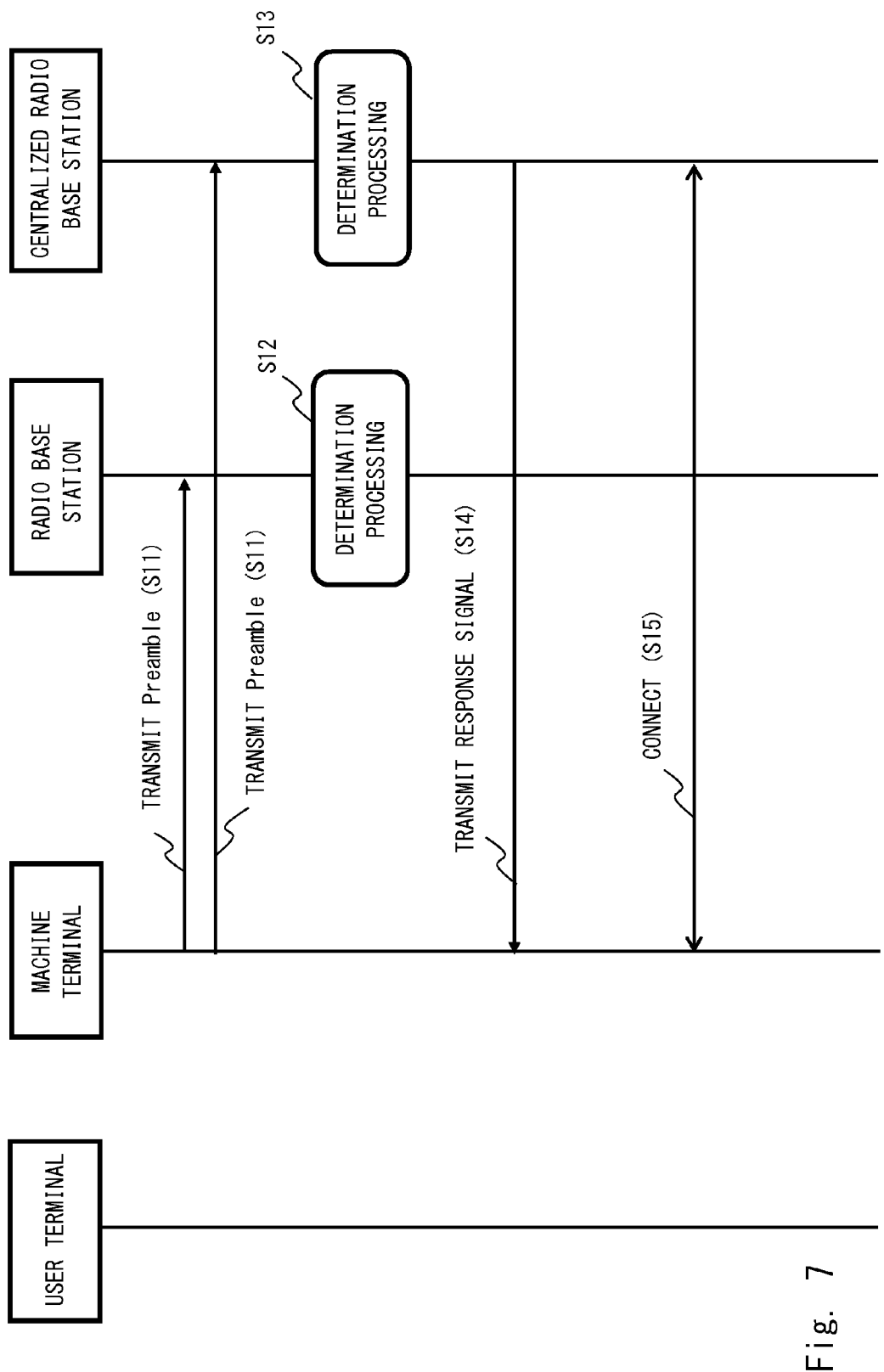
FIG. 7 is a connection sequence of the radio system according to the first exemplary embodiment.

Referring next to FIGS. 6 and 7, connection sequences of the radio communication system according to the first exemplary embodiment of the present invention will be described. FIG. 6 shows a flow of processing performed when a connection request signal is transmitted from the user terminal. First, the user terminal 110 transmits the connection request signal (S1). The connection request signal is transmitted using PRACH Preamble. The connection request signal transmitted from the user terminal 110 is transmitted to each of the radio base station 11 and the centralized radio base station 21 via the RF module 51. Further, the connection request signal transmitted from the user terminal 110 is transmitted using Subframe 1. The radio base station 11 determines whether or not the sub frame used for the connection request signal matches the subframe number set to PRACH Configuration Index (S2). When the connection request is transmitted from the user terminal 110, the sub frame numbers indicate "1" and match each other, so that the radio base station 11 transmits a response signal to the user terminal 110 (S4). Accordingly, the user terminal 110 and the radio base station 11 are connected to each other (S5).

Also the centralized radio base station 21 performs the determination processing in the same manner as in the radio base station 11 (S3). Since PRACH Configuration Index 65 is set to the centralized radio base station 21, the subframe used for the connection request signal by the user terminal 110 is different from the subframe number set to PRACH Configuration Index 65. Accordingly, the centralized radio base station 21 discards the connection request signal and does not perform the subsequent processing.

Referring next to FIG. 7, a flow of processing performed when the connection request signal is transmitted from the machine terminal will be described. First, the machine terminal 210 transmits the connection request signal (Preamble) (S11). The connection request signal transmitted from the machine terminal 210 is transmitted to each of the radio base station 12 and the centralized radio base station 21 via the RF module 54. The connection request signal transmitted from the machine terminal 210 is transmitted using Subframe 9. The centralized radio base station 21 determines whether or not the subframe used for the connection request signal matches the subframe number set to the set PRACH Configuration Index (S13). When the connection request is transmitted from the machine terminal 210, the subframe numbers indicate "9" and match each other, so that the centralized radio base station 21 transmits a response signal to the machine terminal 210 (S14). Accordingly, the machine terminal 210 and the centralized radio base station 21 are connected to each other (S15).

Also the radio base station 11 performs the determination processing in the same manner as in the centralized radio base station 21 (S12). PRACH Configuration Index 6 is set to the radio base station 11. Thus, the subframe used for the connection request signal by the machine terminal 210 is different from the subframe number set to PRACH Configuration Index 6. Accordingly, the radio base station 11 discards the connection request signal and does not perform the subsequent processing.

As described above, the use of the radio system according to the first exemplary embodiment of the present invention enables control such that the user terminal is connected to the radio base station and the machine terminal is connected to the centralized radio base station. Further, the data transmitted from the machine terminal is processed only by the centralized radio base station, which prevents deterioration in the quality of service to the user terminal with which the radio base station performs communication.

Second Exemplary Embodiment

Figure 8:
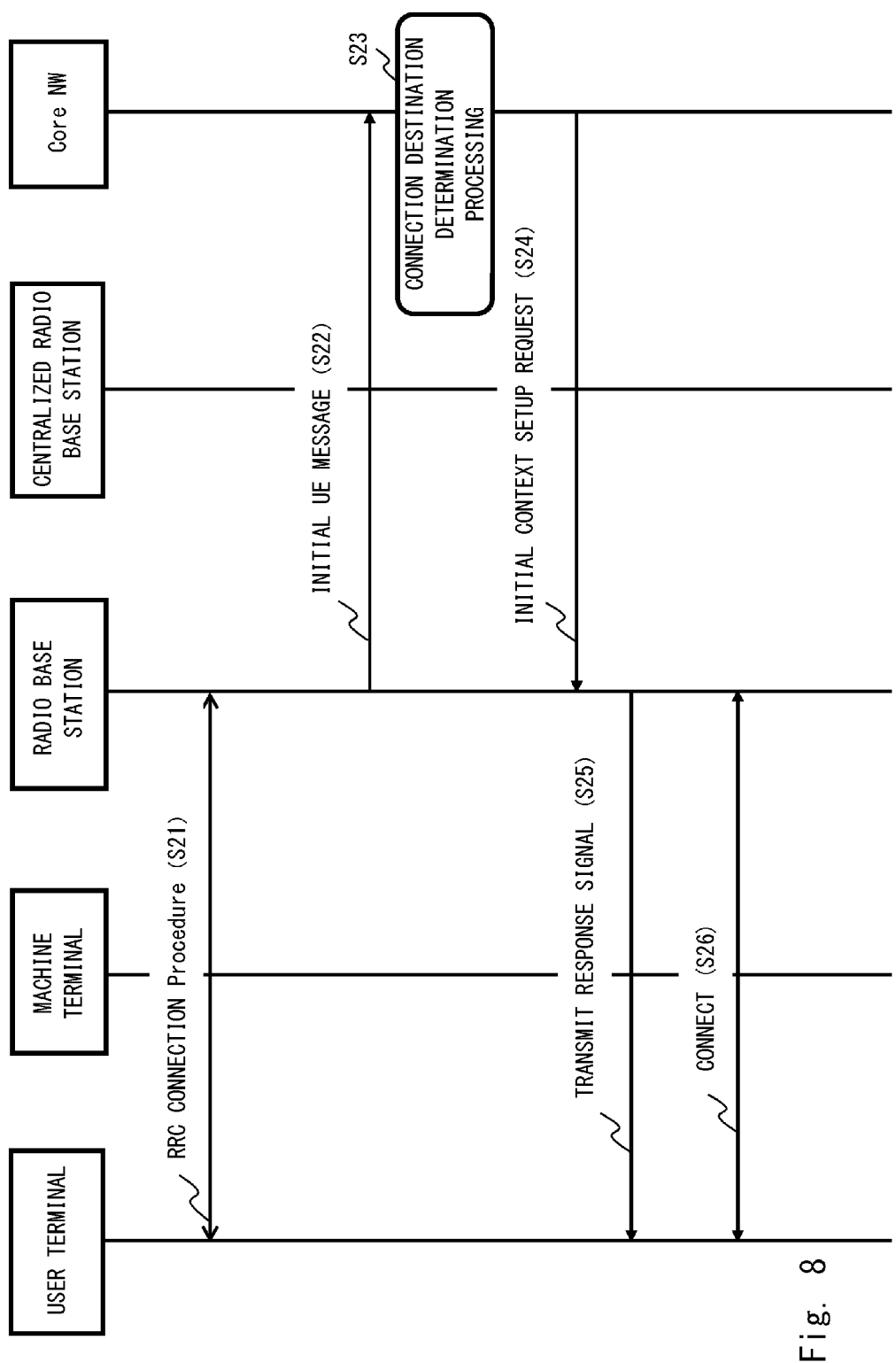
FIG. 8 is a connection sequence of a radio system according to a second exemplary embodiment.
Figure 9:
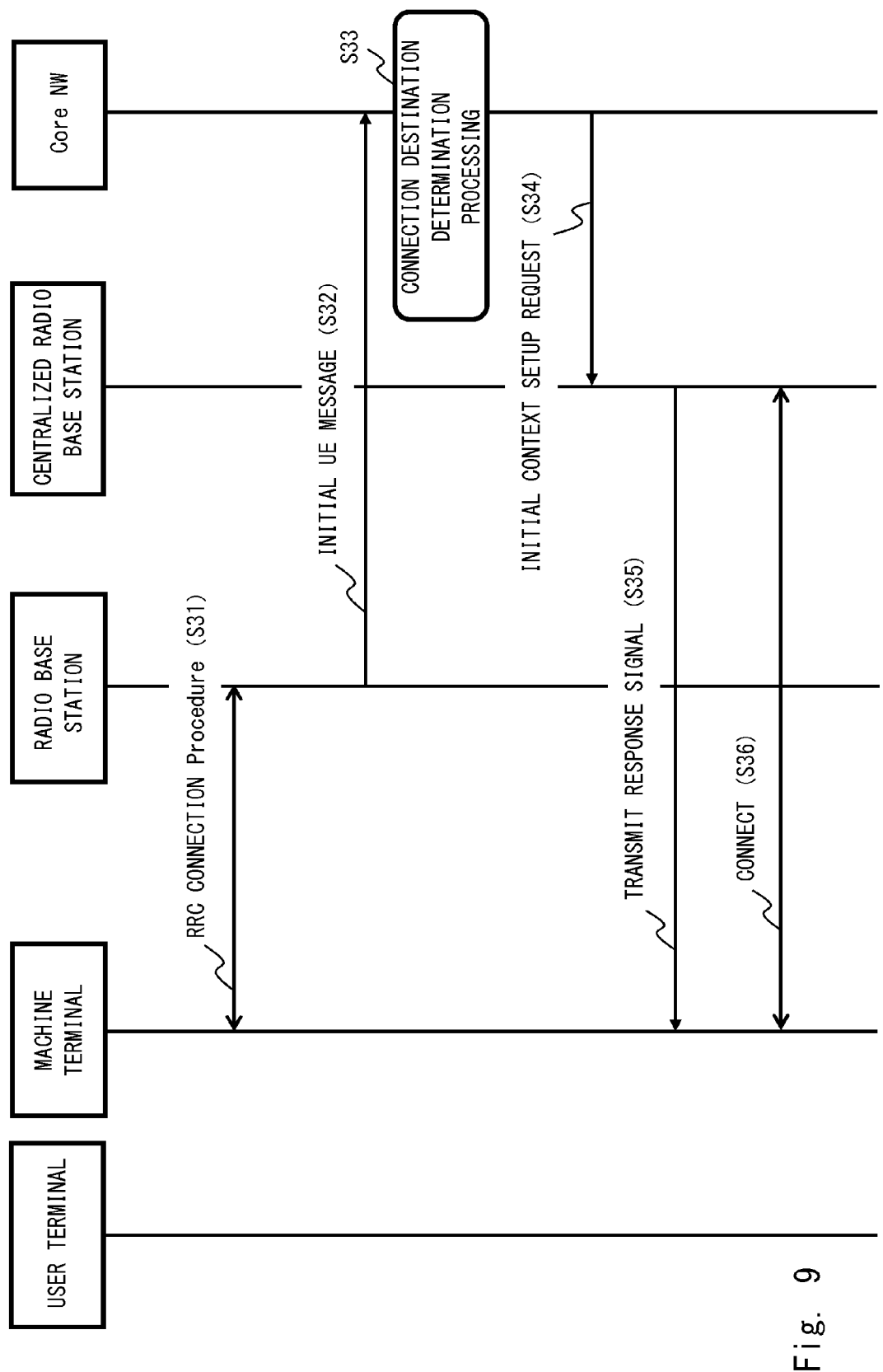
FIG. 9 is a connection sequence of the radio system according to the second exemplary embodiment.

Referring next to FIGS. 8 and 9, a flow of connection processing of a radio system according to a second exemplary embodiment of the present invention will be described. In the radio system according to the second exemplary embodiment of the present invention, a unique identification number (IMEI) of each terminal is used instead of PRACH Configuration used in the first exemplary embodiment. The IMEI is a unique number allocated to each terminal. Thus, the use of IMEI enables determination as to whether the terminal having sent a connection request is a user terminal or a machine terminal.

FIG. 8 shows a flow of connection processing performed when the connection request is made from the user terminal. First, the user terminal 110 executes RRC CONNECTION Procedure to transmit IMEI to the radio base station 11 (S21). As a result, RRC CONNECTION is set between the user terminal 110 and the radio base station 11, so that the user terminal 110 can transmit IMEI to the radio base station 11. Note that in the case of performing the connection determination using IMEI, a first radio connection is established with the radio base station, regardless of whether the terminal is a user terminal or a machine terminal. For example, the user terminal and the machine terminal may execute RRC CONNECTION Procedure with both the radio base station and the centralized radio base station, and RRC CONNECTION may be established only among the user terminal, the machine terminal, and the radio base station, without establishing RRC CONNECTION with the centralized radio base station.

The radio base station 11 sets the transmitted IEMI of the user terminal 110 to INITIAL UE MESSAGE, and transmits it to a core network apparatus 350 (22). For example, the SGW 320 is used as the core network apparatus 350 that receives INITIAL UE MESSAGE. In this case, the SGW 320 includes a determination unit that determines a connection destination of the terminal by using IMEI.

Figure 10:
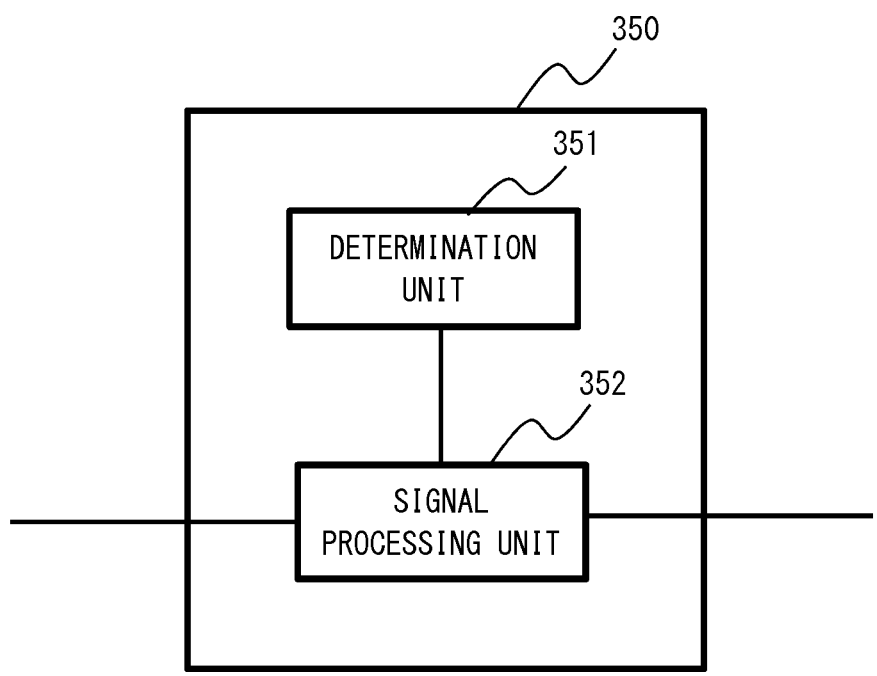
FIG. 10 is a block diagram of a core network apparatus according to the second exemplary embodiment.

Referring now to FIG. 10, a configuration example of the core network apparatus 350 that determines the connection determination of the terminal by using IMEI will be described. The core network apparatus 350 includes a determination unit 351 and a signal processing unit 352. The signal processing unit 352 receives INITIAL UE MESSAGE transmitted from the radio base station or the centralized radio base station, and outputs IMEI to the determination unit 351. The determination unit 351 determines whether the terminal is a user terminal or a machine terminal by using the output IMEI.

Returning to FIG. 8, when it is determined that the transmitted IMEI is identical with the IMEI of the user terminal (S23), the core network apparatus 350 transmits INITIAL CONTEXT SETUP REQUEST to the radio base station 11 to connect to the terminal (S24).

After receiving INITIAL CONTEXT SETUP REQUEST, the radio base station 11 transmits a response signal to the user terminal 110 (S25). Accordingly, the user terminal 110 and the radio base station 11 are connected to each other.

Referring next to FIG. 9, a flow of processing performed when the connection request signal is transmitted from the machine terminal will be described. First, the machine terminal 210 executes RRC CONNECTION Procedure to transmit IMEI to the radio base station 11 (S31). As a result, RRC CONNECTION is set between the machine terminal 210 and the radio base station 11, so that the machine terminal 210 can transmit IMEI to the radio base station 11. Note that, as described above, in the case of performing the connection determination by using IMEI, the first radio connection is established with the radio base station, regardless of whether the terminal is a user terminal or a machine terminal.

The radio base station 11 sets the transmitted IMEI of the machine terminal 210 to INITIAL UE MESSAGE, and transmits it to the core network apparatus 350 (S32). When it is determined that the transmitted IMEI is identical with the IMEI of the machine terminal (S33), the core network apparatus 350 transmits INITIAL CONTEXT SETUP REQUEST to the centralized radio base station 21 to connect to the terminal (S34).

After receiving INITIAL CONTEXT SETUP REQUEST, the centralized radio base station 21 transmits a response signal to the machine terminal 210 (S35). Accordingly, the machine terminal 210 and the centralized radio base station 21 are connected to each other (S36).

As described above, the use of the radio communication system according to the second exemplary embodiment of the present invention enables determination of the base station apparatus to which each terminal is connected, by using IMEI allocated to each terminal. This enables control such that the user terminal is connected to the radio base station and the machine terminal is connected to the centralized radio base station. Further, the data transmitted from the machine terminal is processed only by the centralized radio base station, which prevents deterioration in the quality of service to the user terminal with which the radio base station performs communication.

The first and second exemplary embodiments of the present invention illustrate an example in which each centralized radio base station is configured to cover the areas that are covered by a plurality of radio base stations. However, the configuration of each of the centralized radio base station and the radio base station is not limited to such a network configuration. For example, an inexpensive apparatus composed of a CPU having a lower clock frequency than that of a radio base station, a memory having a small capacity, and the like may be used as each centralized radio base station. In this case, centralized radio base stations and radio base stations may be placed in one-to-one correspondence. Thus, it is possible to employ a configuration in which the cost of each centralized radio base station is minimized to increase the number of centralized radio base stations to be introduced.

Note that the present invention is not limited to the above exemplary embodiments, but can be modified as needed without departing from the scope of the invention.

Though the present invention has been described above with reference to exemplary embodiments, the present invention is not limited by the above exemplary embodiments. The configuration and details of the present invention can be modified in various manners which can be understood by those skilled in the art within the scope of the invention.

This application is based upon and claims the benefit of priority from Japanese patent application No. 2010-102342, filed on Apr. 27, 2010, the disclosure of which is incorporated herein in its entirety by reference.

REFERENCE SIGNS LIST

10 BASE STATION
11-15 RADIO BASE STATION
17 BASEBAND PROCESSING UNIT
20 BASE STATION
21, 22 CENTRALIZED RADIO BASE STATION
24 BASEBAND PROCESSING UNIT
30-32 DETERMINATION UNIT
40 COVERAGE AREA
51-65 AMPLIFIER
100 COMMUNICATION APPARATUS
110 USER TERMINAL
200 COMMUNICATION APPARATUS
210 MACHINE TERMINAL
401-415 COVERAGE AREA
300 AAA/HS
310 MME
320 SGW
330 PG

The invention claimed is:

1. A radio communication system comprising:
a first base station apparatus that performs data communication with a first communication apparatus by using a predetermined frequency band;
a second base station apparatus that performs data communication with a second communication apparatus by using the same frequency band as the frequency band of the first base station apparatus in a coverage area identical with the coverage area of the first base station apparatus; and
a determination unit that acquires identification information included in a connection request transmitted from the first or second communication apparatus by using the frequency band, and determines to connect to the first base station apparatus when the identification information indicates the first communication apparatus, and to connect to the second base station apparatus when the identification information indicates the second communication apparatus,
wherein the identification information is a communication apparatus identifier for identifying the first and second communication apparatuses, and
wherein a service quality required for communication between the second base station apparatus and the second communication apparatus is lower than a service quality required for communication between the first base station apparatus and the second communication apparatus.

2. The radio communication system according to claim 1, wherein
the determination unit is included in each of the first and second base station apparatuses, and
when the connection request is transmitted from the first communication apparatus to the first and second base station apparatuses, the determination unit included in the first base station apparatus determines to connect to the first communication apparatus and the determination unit included in the second base station determines not to connect to the first communication apparatus.

3. The radio communication system according to claim 1, wherein the identification information is included in a signal used for making a connection request from the first or second communication apparatus to the first and second base station apparatuses, upon activation of the first or second communication apparatus.

4. The radio communication system according to claim 1, wherein
the first and second communication apparatuses transmit the connection request to one of the first base station apparatus and the second base station apparatus,
the determination unit acquires the identification information included in the connection request via the first or second base station apparatus having received the connection request,
when the connection request is transmitted from the first communication apparatus, the determination unit determines to connect to the first base station apparatus, and
when the connection request is transmitted from the second communication apparatus, the determination unit determines to connect to the second base station apparatus.

5. The radio communication system according to claim 1, further comprising an amplifier that receives data transmitted from the first and second communication apparatuses and amplifies an amplitude of the data,
wherein the first and second base station apparatuses perform data communication with the first or second communication apparatus via the amplifier.

6. A base station apparatus that performs data communication with a second communication apparatus by using a frequency band identical with a frequency band used in a first base station apparatus that performs data communication with a first communication apparatus, in a coverage area identical with the coverage area of the first base station apparatus, the base station apparatus comprising:
a determination unit that acquires identification information included in a connection request transmitted from the first or second communication apparatus by using the frequency band, and determines not to connect to the first base station apparatus when the identification information indicates the first communication apparatus, and to connect to the second base station apparatus when the identification information indicates the second communication apparatus,
wherein the identification information is a communication apparatus identifier for identifying the first and second communication apparatuses, and
wherein a service quality required for communication between the second base station apparatus and the second communication apparatus is lower than a service quality required for communication between the first base station apparatus and the second communication apparatus.

7. A core network apparatus that is connected to a first base station apparatus and a second base station apparatus, the first base station apparatus being configured to perform data communication with a first communication apparatus by using a predetermined frequency band, the second base station apparatus being configured to perform data communication with a second communication apparatus by using the same frequency band as the frequency band of the first base station apparatus in a coverage area identical with the coverage area of the first base station apparatus, the core network apparatus comprising:
- a determination unit that acquires identification information included in a connection request transmitted from the first or second communication apparatus by using the frequency band, and determines to connect to the first base station apparatus when the identification information indicates the first communication apparatus, and to connect to the second base station apparatus when the identification information indicates the second communication apparatus,
- wherein the identification information is a communication apparatus identifier for identifying the first and second communication apparatuses, and
- wherein a service quality required for communication between the second base station apparatus and the second communication apparatus is lower than a service quality required for communication between the first base station apparatus and the second communication apparatus.

8. A data communication method that performs data communication with a second communication apparatus by using a frequency band identical with a frequency band used in a first base station that performs data communication with a first communication apparatus, in a coverage area identical with the coverage area of the first base station, the method comprising:
- acquiring, from the first or second communication apparatus, identification information included in a connection request transmitted using the frequency band; and
- disconnecting from the first communication apparatus when the identification information indicates the first communication apparatus, and connecting to the second communication apparatus when the identification information indicates the second communication apparatus,
- wherein the identification information is a communication apparatus identifier for identifying the first and second communication apparatuses, and
- wherein a service quality required for communication between the second base station apparatus and the second communication apparatus is lower than a service quality required for communication between the first base station apparatus and the second communication apparatus.

* * * * *